(12) United States Patent
Yarvis et al.

(10) Patent No.: US 8,611,275 B2
(45) Date of Patent: Dec. 17, 2013

(54) METHODS AND APPARATUS FOR PROVIDING AN INTEGRATED MULTI-HOP ROUTING AND COOPERATIVE DIVERSITY SYSTEM

(75) Inventors: Mark D. Yarvis, Portland, OR (US); Sumeet Sandhu, San Jose, CA (US); W. Steven Conner, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2138 days.

(21) Appl. No.: 11/206,494

(22) Filed: Aug. 17, 2005

(65) Prior Publication Data

US 2007/0041345 A1 Feb. 22, 2007

(51) Int. Cl.
*H04W 4/00* (2009.01)

(52) U.S. Cl.
USPC ........... 370/328; 370/310; 370/331; 370/338; 370/400; 370/503; 455/445; 455/11.1; 455/16; 455/41.2; 455/502; 455/513; 455/9; 455/67.11

(58) Field of Classification Search
USPC .................................. 370/310, 328, 331, 338
See application file for complete search history.

(56) References Cited

U.S. PATENT DOCUMENTS

| | | | | |
|---|---|---|---|---|
| 5,412,654 | A * | 5/1995 | Perkins .......................... | 370/312 |
| 6,304,556 | B1 * | 10/2001 | Haas .............................. | 370/254 |
| 7,386,036 | B2 * | 6/2008 | Pasanen et al. ................ | 375/211 |
| 2004/0022224 | A1 * | 2/2004 | Billhartz ....................... | 370/338 |
| 2004/0266339 | A1 | 12/2004 | Larsson | |
| 2005/0014464 | A1 * | 1/2005 | Larsson ........................ | 455/11.1 |
| 2006/0262758 | A1 | 11/2006 | Sandhu | |
| 2006/0270363 | A1 | 11/2006 | Sandhu | |
| 2008/0089257 | A1 * | 4/2008 | Markki et al. ................. | 370/310 |

FOREIGN PATENT DOCUMENTS

WO WO02/15613 A1 2/2002

OTHER PUBLICATIONS

Perkins et al., "Ad-hoc On-Demand Distance Vector Routing," Proceedings WMCSA, Feb. 25, 1999, 11 pgs., XP002173721.
Jiang et al., "An efficient multiple-path routing protocol for ad hoc networks," Computer Communications, Elsevier Science Publishers BV, Amsterdam, NL, vol. 25, No. 5, Mar. 15, 2002, 7 pgs., XP004332672, ISSN: 0140-3664.
International Search Report and Written Opinion issued in International Application No. PCT/US2006/030522, Nov. 15, 2006.
Thomas M. Cover, et al., "Capacity Theorems for the Relay Channel", IEEE Trans. on Information Theory, vol. IT-25, No. 5, Sep. 1979, pp. 572-584.
Ochiai, Hideki et al., "Design and Analysis of Collaborative Diversity Protocols for Wireless Sensor Networks," Vehicular Technology Conference, Sep. 26, 2004, pp. 4645-4649, vol. 7, IEEE.
Notice of Allowance issued Nov. 5, 2012 in Chinese Application No. 200680029906.X.
Tope, Michael A., "Performance Evaluation of a Cooperative Diversity Enhanced Ad Hoc Network," Naval Postgraduate School, Monterey, California, Thesis, Dec. 2002, pp. i-77.
Office Action issued Nov. 3, 2011 from German Patent Application No. 11 2006 002 156.7.
Office Action issued Jan. 4, 2012 in Chinese Patent Application No. 200680029906.X.
Office Action issued Jul. 6, 2012 in Chinese Application No. 200680029906.X.

* cited by examiner

*Primary Examiner* — Willie J Daniel, Jr.
(74) *Attorney, Agent, or Firm* — Schwabe, Williamson & Wyatt, P.C.

(57) ABSTRACT

Embodiments of methods and apparatus for providing an integrated multi-hop routing and cooperative diversity system are generally described herein. Other embodiments may be described and claimed.

16 Claims, 6 Drawing Sheets

METHODS AND APPARATUS FOR PROVIDING AN INTEGRATED MULTI-HOP ROUTING AND COOPERATIVE DIVERSITY SYSTEM

TECHNICAL FIELD

The present disclosure relates generally to wireless communication systems, and more particularly, to methods and apparatus for providing an integrated multi-hop routing and cooperative diversity system.

BACKGROUND

As wireless communication becomes more and more popular at offices, homes, schools, etc., the demand for resources may cause network congestions and slowdowns. To reduce performance degradations and/or overload conditions, a wireless mesh network may be implemented in a wireless communication system. In particular, a wireless mesh network may include two or more nodes. If one node fails to operate properly, the remaining nodes of a wireless mesh network may still be able to communicate with each other either directly or through one or more intermediate nodes. Accordingly, a wireless mesh network may provide multiple paths for a transmission to propagate from the source to the destination. Thus, a wireless mesh network may be a reliable solution to support the increasing demand for wireless communication services.

DETAILED DESCRIPTION

In general, methods and apparatus for providing an integrated multi-hop routing and cooperative diversity system are described herein. The methods and apparatus described herein are not limited in this regard.

Figure 1:
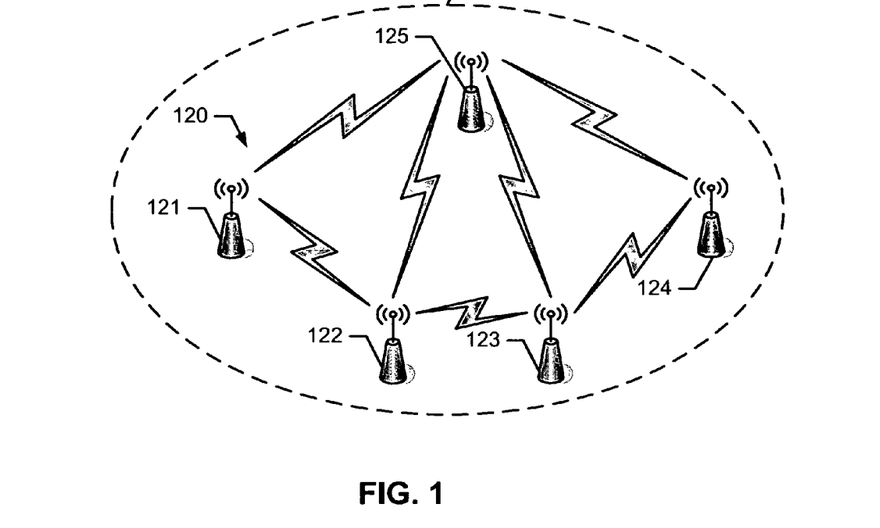
FIG. 1 is a schematic diagram representation of an example wireless communication system according to an embodiment of the methods and apparatus disclosed herein.

Referring to FIG. 1, an example wireless communication system 100 including a wireless mesh network 110 is described herein. In one example, the wireless mesh network 110 may be an extended service set (ESS) mesh network based on developments by the Institute of Electrical and Electronic Engineers (IEEE). The wireless mesh network 110 may include a plurality of mesh nodes 120, generally shown as 121, 122, 123, 124, and 125. Although FIG. 1 depicts five mesh nodes, the wireless mesh network 110 may include additional or fewer mesh nodes.

As described in detail below, the plurality of mesh nodes 120 may include access points, redistribution points, end points, and/or other suitable connection points for traffic flows via mesh paths having multiple hops. One or more of the plurality of mesh nodes 120 may also be operatively coupled to a common public or private network such as the Internet, a telephone network, a local area network (LAN), a cable network, and/or another wireless network via connection to an Ethernet, a digital subscriber line (DSL), a telephone line, a coaxial cable, and/or any wireless connection, etc. Accordingly, the wireless mesh network 110 may be implemented to provide a wireless personal area network (WPAN), a wireless local area network (WLAN), a wireless metropolitan area network (WMAN), a wireless wide area network (WWAN), and/or other suitable wireless communication networks.

The plurality of mesh nodes 120 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, one or more of the plurality of mesh nodes 120 may implement OFDM modulation to transmit large amounts of digital data by splitting a radio frequency signal into multiple small sub-signals, which in turn, are transmitted simultaneously at different frequencies. In particular, the plurality of mesh nodes 120 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via wireless links.

For example, the plurality of mesh nodes 120 may operate in accordance with the 802.16 family of standards developed by IEEE to provide for fixed, portable, and/or mobile broadband wireless access (BWA) networks (e.g., the IEEE std. 802.16, published 2004). The plurality of mesh nodes 120 may also use direct sequence spread spectrum (DSSS) modulation (e.g., the IEEE std. 802.11b) and/or frequency hopping spread spectrum (FHSS) modulation (e.g., the IEEE std. 802.11). Although the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). For example, the plurality of mesh nodes 120 may also operate in accordance with other suitable wireless communication protocols that require very low power such as Bluetooth®, Ultra Wideband (UWB), and/or radio frequency identification (RFID) to communicate via wireless links.

Alternatively, the plurality of mesh nodes 120 may communicate via wired links (not shown). For example, the plurality of mesh nodes 120 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate.

In addition to the wireless mesh network 110, the wireless communication system 100 may include other communication networks. In one example, the wireless communication system 100 may include a basic service set (BSS) network (not shown). One or more of the plurality of mesh nodes 120 may communicate with an access point (AP) associated with the BSS network. The BSS network may include one or more stations. For example, a station associated with the BSS network may be a wireless electronic device such as a laptop computer, a handheld computer, a tablet computer, a cellular telephone (e.g., a smart phone), a pager, an audio and/or video player (e.g., an MP3 player or a DVD player), a gaming device, a digital camera, a navigation device (e.g., a GPS device), a wireless peripheral (e.g., a headset, a keyboard, a mouse, etc.) and/or other suitable mobile or portable electronic devices. In another example, one or more of the plurality of mesh nodes 120 may operate as an AP associated with the BSS network (e.g., a mesh AP). Thus, the mesh AP may be a part of the wireless mesh network 110 and the BSS network.

The wireless communication system 100 may also include one or more radio access networks (RANs) such as a cellular radio network (not shown). The RAN may include one or more base stations, and other radio components necessary to provide wireless communication services. The base stations may operate in accordance with the applicable standard(s) for providing wireless communication services. That is, the base stations of the RAN may be configured to operate in accordance with one or more of several wireless communication protocols.

In particular, the wireless communication protocols may be based on analog, digital, and/or dual-mode communication system standards that use multiple access techniques such as frequency division multiple access (FDMA), time division multiple access (TDMA), and/or code division multiple access (CDMA). For example, the wireless communication protocols may include Global System for Mobile Communications (GSM), Wideband CDMA (W-CDMA), General Packet Radio Services (GPRS), Enhanced Data GSM Environment (EDGE), Universal Mobile Telecommunications System (UMTS), High-Speed Downlink Packet Access (HSDPA), variations and evolutions of these standards, and/or other suitable wireless communication standards.

Further, the wireless communication system 100 may include other wireless personal area network (WPAN) devices, wireless local area network (WLAN) devices, wireless metropolitan area network (WMAN) devices, and/or wireless wide area network (WWAN) devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system (not shown). Accordingly, the wireless communication system 100 may be implemented to provide WPANs, WLANs, WMANs, WWANs, and/or other suitable wireless communication networks. Although certain examples have been described above, the scope of coverage of this disclosure is not limited thereto.

Figure 2:
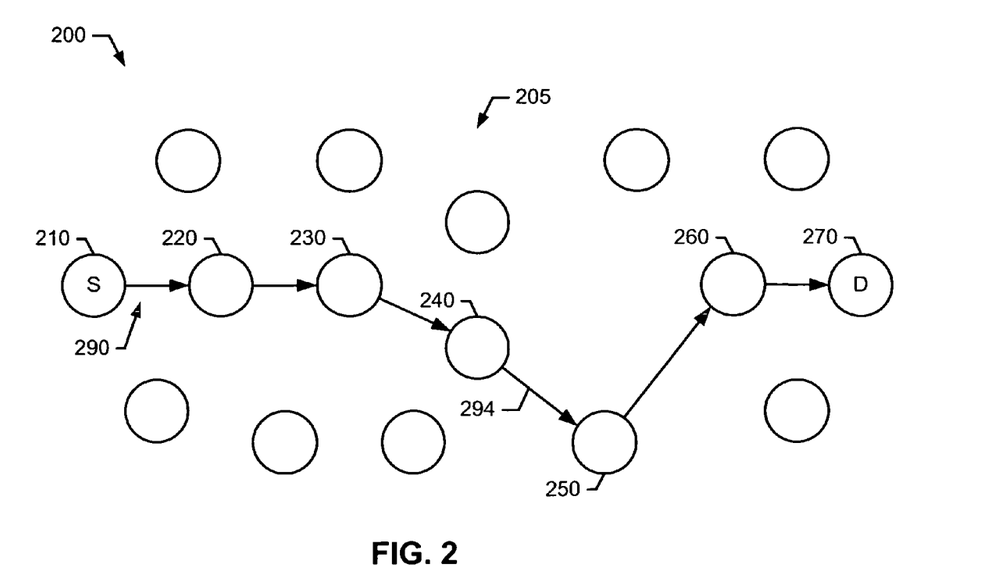
FIG. 2 depicts an example wireless mesh network operating in accordance with a multi-hop routing protocol.

In the example of FIG. 2, a wireless mesh network 200 operating in accordance with a multi-hop routing protocol may include a plurality of mesh nodes 205, generally shown as 210, 220, 230, 240, 250, 260, and 270. Although FIG. 2 depicts sixteen communication nodes, the wireless mesh network 200 may include additional or fewer communication nodes.

A multi-hop routing protocol (e.g., Ad-Hoc On-Demand Distance Vector (AODV) routing protocol or Destination-Sequenced Distance Vector (DSDV) routing protocol) may identify a route across the wireless mesh network 200 over which a packet may be forwarded from node to node. In one example, the mesh node 210 may be the source node (S), and the mesh node 270 may be the destination node (D). The multi-hop routing protocol may identify a route 290 (e.g., shown by solid arrows) including multiple hops from the source node 210 to the destination node 270 (e.g., the hop 294 between the mesh nodes 240 and 250).

Figure 3:
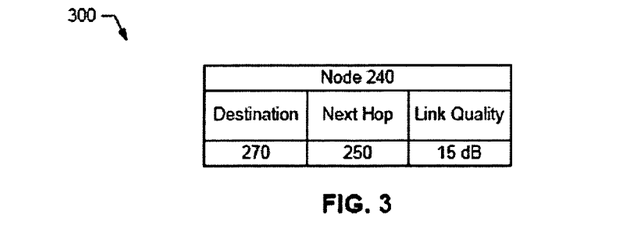
FIG. 3 is a block diagram representation of an example routing table of a communication node associated with the example wireless mesh network of FIG. 2.

The multi-hop routing protocol may be based on tables such that each of the plurality of mesh nodes 205 may include a routing table (e.g., one shown as 300 in FIG. 3). As described in detail below, the routing table may include routing information such as destination node information, next hop information, metric information, and/or other suitable routing information.

Turning to FIG. 3, for example, the routing table 300 of the mesh node 240 may include information indicating that the destination node is the mesh node 270 via the route 290. The routing table 300 may also include information indicating that the next hop from the mesh node 240 to the mesh node 270 is the mesh node 250. Further, the routing table 300 may include information indicative of a characteristic/condition of the route 290 to compare to other routes. In particular, the metric information may indicate a hop count from one node to another. For example, the metric information may indicate that the mesh node 240 is three hops from the mesh node 270. In addition or alternatively, the metric information may include information indicate an estimate transmission count (ETX) and/or an end-to-end success rate.

Figure 4:
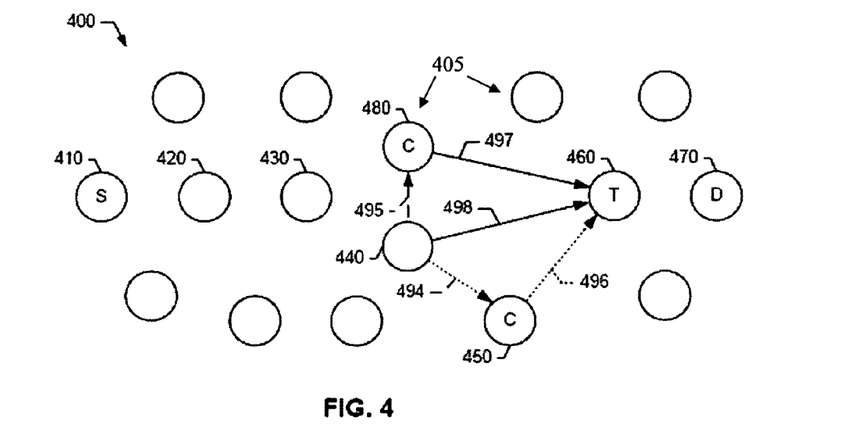
FIG. 4 depicts an example wireless mesh network operating in accordance with a cooperative diversity protocol.

In the example of FIG. 4, a wireless mesh network 400 operating in accordance with a cooperative diversity protocol may include a plurality of mesh nodes 405, generally shown as 410, 420, 430, 440, 450, 460, and 470. Although FIG. 4 depicts sixteen communication nodes, the wireless mesh network 400 may include additional or fewer communication nodes.

The cooperative diversity protocol may identify two or more of the plurality of mesh nodes 405 to transmit a packet simultaneously to a distant node (e.g., candidate nodes). In one example, the mesh nodes 450 and 480 may be candidate nodes (C) of the mesh node 440, the mesh node 460 may be a target node (T), and the mesh node 470 may be the destination node (D). In particular, the target node 460 may be a distant neighbor node relative to the mesh node 440 en route to the destination node 470. The candidate nodes 450 and 480 may be neighbor nodes relatively closer to the mesh node 440 than the target node 460. Thus, the candidate nodes 450 and/or 480 may cooperate with the mesh node 440 to communicate with the target node 460. For example, the mesh node 440 may forward a packet to the candidate node 450 via the link 494 and/or to the candidate node 480 via the link 495.

As described in detail below, the mesh node 440 may select the candidate nodes 450 and/or 480 to operate as cooperator node(s). When both the mesh node 440 and the cooperator node(s) (e.g., selected candidate node(s) 450 and/or 480) have the packet, the mesh node 440 and the cooperator node(s) may cooperate by transmitting the packet simultaneously to the target node 460. For example, the mesh node 440 and the candidate node 450 may simultaneously transmit a packet to the target node 460. In another example, the mesh node 440 and both candidate nodes 450 and 480 may simultaneously transmit a packet to the target node 460.

The mesh node 440 may include a cooperation table (e.g., one shown as 500 in FIG. 5) to identify and select one or more cooperator nodes based on the plurality of candidate nodes. In particular, the cooperation table may include cooperation information such as neighbor node information, cooperator node information, metric information, and/or other suitable cooperation information.

Figure 5:
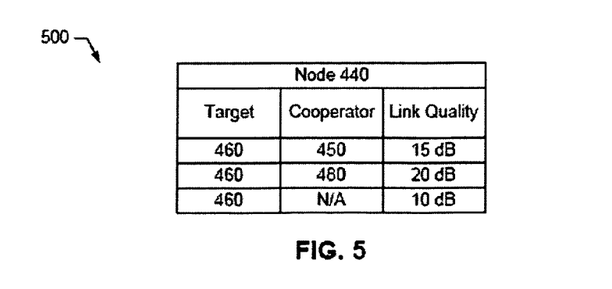
FIG. 5 is a block diagram representation of an example cooperation table of a communication node associated with the example wireless mesh network of FIG. 4.

Referring to FIG. 5, for example, the cooperation table 500 of the mesh node 440 may indicate that the mesh node 460 may be a target node for the mesh node 440. The cooperation table 500 may also indicate a cooperator node, if any, to the target node 460. Further, the cooperation table 500 may provide information indicative of a characteristic/condition of each path to the target node 460 (i.e., with or without cooperation from a cooperator node).

In one example, the cooperation table 500 may provide information indicative of link quality associated with cooperative diversity. In particular, the cooperation table 500 may indicate the link quality of each path to the target node 460. For example, the cooperation table 500 may indicate that the link quality of the link 496 (e.g., from the candidate node 450 to the target node 460) is fifteen decibels (15 dB), and the link quality of the link 497 (e.g., from the candidate node 480 to the target node 460) is twenty dB (20 dB). The cooperation table 500 may also indicate the link quality of a path from the mesh node 440 to the target node 460. For example, the cooperation table 500 may indicate that the link quality of the link 498 is ten dB (10 dB).

Based on the cooperation table 500, the mesh node 440 may select the candidate node 480 as the cooperator node instead of the candidate node 450 because of the link quality of the link 497 is better than the link quality of the link 496. The mesh node 440 may forward a packet to the cooperator node 480 via the link 495. Accordingly, the mesh node 440 and the cooperator node 480 may transmit the packet simultaneously to the target node 460.

In another example, the mesh node 440 may cooperate with both the candidate nodes 450 and 480 to communicate with the target node 460 (i.e., the mesh node 440 may select both candidate nodes 450 and 480 to operate as cooperator nodes). Thus, the mesh node 440 may forward a packet to the cooperator node 450 via the link 494 and to the cooperator node 480 via the link 495. The mesh node 440 and the cooperator nodes 450 and 480 may transmit the packet simultaneously to the target node 460.

As described above, a plurality of communication nodes may operate in accordance with a multi-hop routing protocol to forward a packet sequentially from one communication node to another until the destination node receives the packet. For example, a communication node may transmit a packet to a neighbor node (e.g., the next hop of a multi-hop route), which in turn, forwards the packet to another node. The multi-hop routing protocol may increase end-to-end range and/or reliability. However, the multi-hop routing protocol may be limited to a particular range for each hop.

With a cooperative diversity protocol, two or more communication nodes may transmit simultaneously (or concurrently) and independently to allow a relatively distant node to receive a transmission. For example, a communication node may transmit a packet to a neighbor node (e.g., the next hop of a multi-hop route). The communication node and the neighbor node may cooperate with each other to forward the packet to the distant node. Thus, the cooperative diversity protocol may extend the transmission range at a particular transmission power or vice versa. However, the cooperative diversity protocol may provide numerous candidates for a particular communication node to cooperate with to reach the distant node.

Based on signal propagation, node topology, and/or other condition/characteristic of a wireless communication network, either the multi-hop routing protocol or the cooperative diversity protocol may be more effective. Accordingly, the methods and apparatus described herein may provide an integrated multi-hop routing and cooperative diversity system that may operate in accordance with a multi-hop routing protocol and a cooperative diversity protocol to identify an optimal path to route a packet. The methods and apparatus described herein are not limited in this regard.

Figure 6:
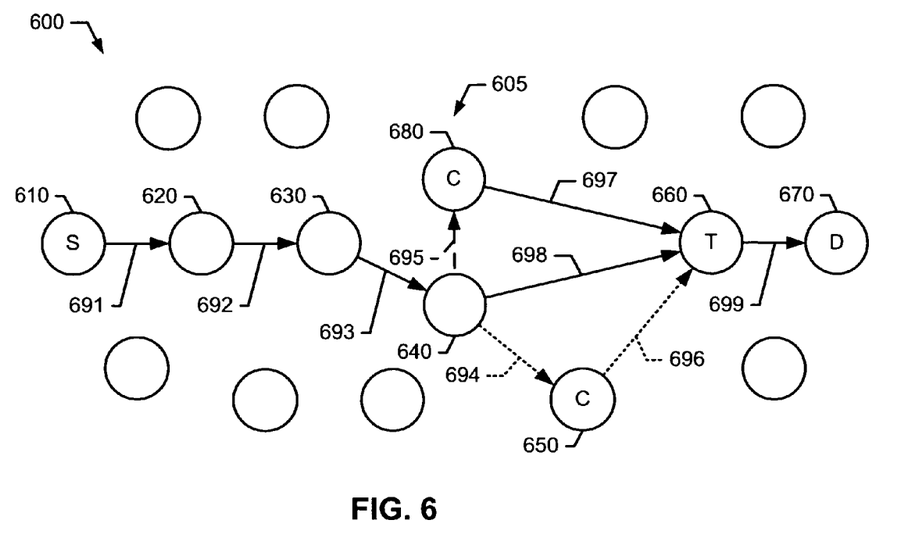
FIG. 6 is a block diagram representation of an example communication node.

In the example of FIG. 6, an integrated multi-hop routing and cooperative diversity system 600 may include a plurality of communication nodes 605, generally shown as, 610, 620, 630, 640, 650, 660, 670, and 680. Although FIG. 6 depicts sixteen communication nodes, the integrated multi-hop routing and cooperative diversity system 600 may include additional or fewer communication nodes.

Figure 7:
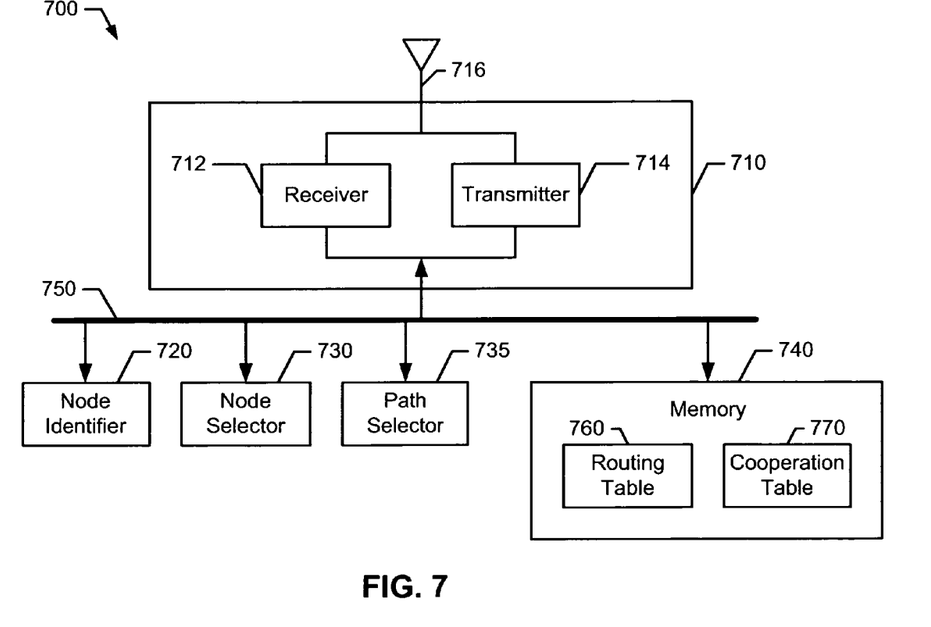
FIG. 7 is a block diagram representation of an example protocol stack associated with the example communication node of FIG. 6.

Turning to FIG. 7, a communication node 700 of the integrated multi-hop routing and cooperative diversity system 600 (e.g., the communication node 640 of FIG. 6) may include a communication interface 710, a node identifier 720, a node selector 730, a path selector 735, and a memory 740. Although FIG. 7 depicts components of the communication node 700 coupling to each other via a bus 750, these components may be operatively coupled to each other via other suitable direct or indirect connections (e.g., a point-to-point connection).

The communication interface 710 may include a receiver 712, a transmitter 714, and an antenna 716. The communication interface 710 may receive and/or transmit data via the receiver 712 and the transmitter 714, respectively. The antenna 716 may include one or more directional or omnidirectional antennas such as dipole antennas, monopole antennas, patch antennas, loop antennas, microstrip antennas, and/or other types of antennas suitable for transmission of radio frequency (RF) signals. Although FIG. 7 depicts a single antenna, the communication node 700 may include additional antennas. For example, the communication node 700 may include a plurality of antennas to implement a multiple-input-multiple-output (MIMO) system.

As described in detail below, the node identifier 720 may identify a target node. In particular, the target node may be associated with a path from the communication node toward a destination node of a multi-hop route. The node selector 730 may select one or more neighbor nodes (e.g., candidate node(s)) so that the communication node 700 and the selected one or more neighbor nodes (e.g., cooperator node(s)) may operate cooperatively to communicate with the target node. The path selector 735 may select a sub-path (e.g., either a multi-hop routing sub-path or a cooperative diversity sub-path) to route a packet from the communication node 700 toward the destination node.

The memory 740 may store a routing table 760 and a cooperation table 770. The routing table 760 may include routing information such as destination node information, next hop information, metric information, and/or other suitable routing information. The cooperation table 770 may include cooperation information such as neighbor node information, cooperator node information, metric information, and/or other suitable cooperation information. Although the above example describes the memory 740 storing tables, other suitable data structures (e.g., lists, arrays, etc.) may be used to store routing and cooperation information in the memory 740.

While the components shown in FIG. 7 are depicted as separate blocks within the communication node 700, the functions performed by some of these blocks may be integrated within a single semiconductor circuit or may be implemented using two or more separate integrated circuits. For example, although the receiver 712 and the transmitter 714 are depicted as separate blocks within the communication interface 710, the receiver 712 may be integrated into the transmitter 714 (e.g., a transceiver). In another example, although the node identifier 720 and the node selector 730 are depicted as separate blocks, the node identifier 720 and the node selector 730 may be integrated into a single component.

Figure 8:
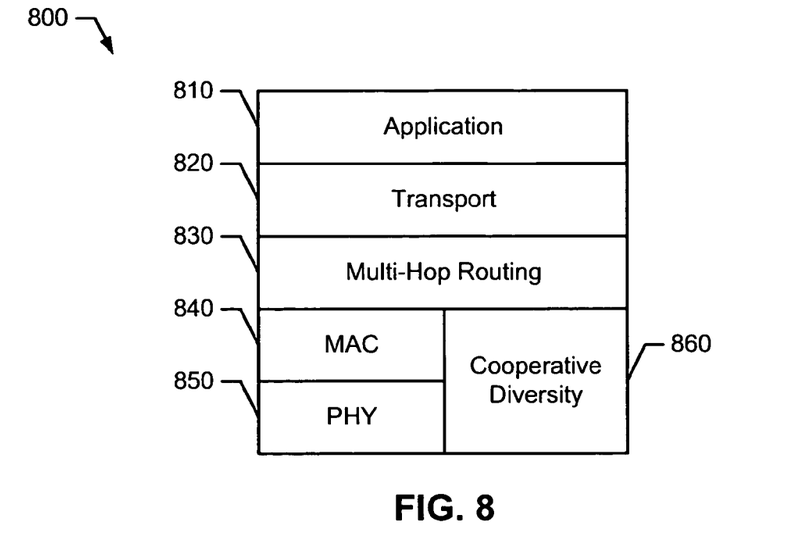
FIG. 8 depicts an example integrated multi-hop routing and cooperative diversity system.

To select dynamically a path to route a packet based on a multi-hop routing protocol and a cooperative diversity protocol, the communication node 700 may include a protocol stack based on the Open Systems Interconnection (OSI) Reference Model (e.g., the protocol stack 800 of FIG. 8). Referring to FIG. 8, for example, the protocol stack 800 may include an application layer 810, a transport layer 820, a multi-hop routing layer 830, a media access address (MAC) layer 840, and a physical (PHY) layer 850. Although FIG. 8 depicts a particular number of protocol layers, the protocol stack 800 may include additional or fewer protocol layers.

The application layer 810 may enable applications to access network services. In particular, the application layer 810 may perform common application services for application processes. For example, the application layer 710 may include protocols such as Hypertext Transfer Protocol (HTTP), File Transfer Protocol (FTP), Telnet, Simple Mail Transfer Protocol (STMP), Simple Network Management Protocol (SNMP), Network Time Protocol (NTP), Network File System (NFS), X.400, X.500, etc.

The transport layer 820 may establish sessions and ensure reliability of data flow. In particular, the transport layer 820 may provide transparent transfer of data between end users. For example, the transport layer 820 may include protocols such as Net Basic Input/Output System (BIOS) Extended User Interface (NetBEUI), Sequence Packet Exchange (SPX), User Datagram Protocol, Transmission Control Protocol (TCP), etc.

In general, the multi-hop routing layer 830 (i.e., network layer) may handle link services, and addressing, routing, and error checking functions. For example, the multi-hop routing layer 830 may include protocols such as NetBEUI, Internet Packet Exchange (IPX), Internet Protocol (IP), AODV, DSDV, etc. As described in detail below, the multi-hop routing layer 830 may operate to identify a target node for the communication node 700 and determine whether to forward a packet to the target node via a multi-hop routing sub-path or a cooperative diversity sub-path.

The MAC layer 840 (i.e., data link layer) may transfer data between network entities, and correct errors that may occur in the PHY layer 850. For example, the MAC layer 840 may include protocols such as Ethernet, Token Ring, Fiber Distributed Data Interface (FDDI), Point-to-Point Protocol (PPP), Frame Relay, High-Level Data Link Control (HDLC), Asynchronous Transfer Mode (ATM), X.25, Carrier Sense Multiple Access (CSMA), CSMA with Collision Avoidance (CSMA/CA), CSMA with Collision Detection (CSMA/CD), etc.

The PHY layer 850 may establish and terminate a connection to a communication medium. In particular, the PHY layer 850 may perform services requested by the MAC layer 840. For example, the PHY layer 850 may include protocols such as RS-232, DSL, Integrated Services Digital Network (ISDN), Ti, OFDM, etc.

Although the above examples may describe particular protocols for the protocol layers of the protocol stack 800, each protocol layer may include other suitable protocols. For example, the MAC layer 840 and the PHY layer 850 may include other suitable wired or wireless protocols.

The protocol stack 800 may also include a cooperative diversity layer 860. The cooperative diversity layer 860 may be operatively coupled to the MAC layer 840 and independent of the multi-hop routing layer 830. In one example, the cooperative diversity layer 860 may integrated with the MAC layer 840 and/or the PHY layer 850, and the multi-hop routing layer 830 may be stacked above the MAC layer 840. As described in detail below, the multi-hop routing layer 830 may request a packet to be sent to a neighbor node of the communication node 600 (e.g., the next hop). The cooperation layer 860 may use the cooperation table 770 to determine the cooperation, if any, required to reach the neighbor node selected by the multi-hop routing layer 830.

By integrating multi-hop routing and cooperative diversity, the multi-hop routing layer 830 may identify a particular target for the cooperation layer 860, which may reduce the resource needed to search for cooperator node(s) to form a sub-path of a path from the communication node 700 toward the destination. In turn, the cooperation layer 860 may provide a greater selection of paths for the multi-hop routing layer 830.

While the components shown in FIG. 8 are depicted as separate blocks within the protocol stack 800, the functions performed by some of these protocol layers may be integrated within a single protocol layer or may be implemented using two or more separate protocol layers. For example, although the multi-hop routing layer 830 and the MAC layer 840 are depicted as separate blocks within the protocol stack 800, the multi-hop routing layer 830 may be integrated into the MAC layer 840 as long as the cooperative diversity layer 860 is independent of the multi-hop routing layer 830. In one example, the multi-hop routing layer 830 may be integrated into an upper portion of the MAC layer 840 whereas the cooperative diversity layer 860 may be integrated into a lower portion of the MAC layer 840. The methods and apparatus described herein are not limited in this regard.

Referring back to FIG. 6, each of the plurality of communication nodes 605 may operate in accordance with a multi-hop routing protocol (e.g., AODV, DSDV, etc.) to identify a route from a source node to a destination node. In one example, the communication node 610 may be a source node (S) and the communication node 870 may be a destination node (D). A multi-hop route from the source node 610 to the destination node 670 may include links 691, 692, 693, 694, 696, and 699 (e.g., a multi-hop routing sub-path).

Figure 9:
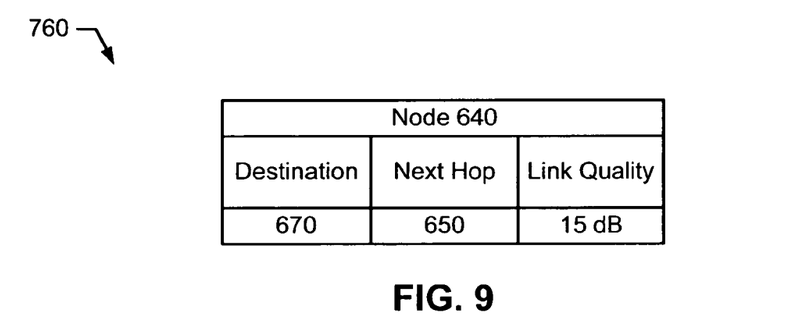
FIG. 9 is a block diagram representation of an example routing table of the example communication node of FIG. 6.

As noted above, the communication node 640 may determine that the communication node 650 is the next hop for the communication node 640 toward the communication node 670. Accordingly, the communication node 640 may update a corresponding routing table (e.g., the routing table 760 of FIG. 9). In the example of FIG. 9, the routing table 760 may indicate the link quality (e.g., signal strength) and/or other suitable metric information of the link between the communication nodes 640 and 650. Although FIG. 9 depicts one entry, the routing table 760 may include additional entries.

Further, each of the plurality of communication nodes 605 may operate in accordance with a multi-hop routing protocol to identify a target node (T) (e.g., a two-hop neighbor node). For example, the node identifier 720 (e.g., via the multi-hop routing layer 830) may identify the target node for the communication node 700. In a unidirectional route, a communication node may have one two-hop neighbor node. In one example, the communication node 660 may be a two-hop neighbor node of the communication node 640 (e.g., via a path through the communication node 650 selected by the multi-hop routing layer 830). Alternatively, in a bi-directional route, a communication node may have two two-hop neighbor nodes.

To identify the target node, each of the plurality of communication nodes 605 may transmit a broadcast message indicating a corresponding one-hop neighbor node. For example, the communication node 700 (e.g., via the communication interface 710) may transmit the broadcast message. In one example, the communication node 650 may periodically transmit a broadcast message indicating that the communication node 660 is the next hop for the communication node 650 toward the communication node 670 (i.e., the communication node 660 is the corresponding one-hop neighbor node of the communication node 650). The communication node 640 may receive the broadcast message from the communication node 650 because the communication node 640 is a neighbor node of the communication node 650.

In one example, the multi-hop routing layer 830 of the communication node 700 may provide the identity of the two-hop neighbor node (e.g., the communication node 660 of FIG. 6) to the cooperative diversity layer 860. The two-hop neighbor node may become the target node for the cooperative diversity layer 860, which attempts to create a link to the target node by cooperating with one or more neighbor nodes (i.e., candidate nodes (C)).

The node selector 730 (e.g., via the cooperative diversity layer 860) may select one or more candidate nodes to operate as cooperator node(s) based on metric information to reach a target node. For example, the cooperative diversity layer 860 may identify one or more neighbor nodes associated with a condition indicative of a strong communication link with the communication node 640 as candidate node(s) (e.g., a high signal-to-noise ratio (SNR), a link that supports high bit rates, etc.). The cooperative diversity layer 860 may select one or more of the candidate node(s) to operate as the cooperator node(s). In particular, the communication node 640 and the cooperator node(s) may operate cooperatively to communicate with the target node 660. Accordingly, the cooperative diversity layer 860 may add an entry associated with each of the selected cooperator node(s) to a corresponding cooperative diversity table (e.g., the cooperative diversity table 770 of FIG. 10).

Figure 10:
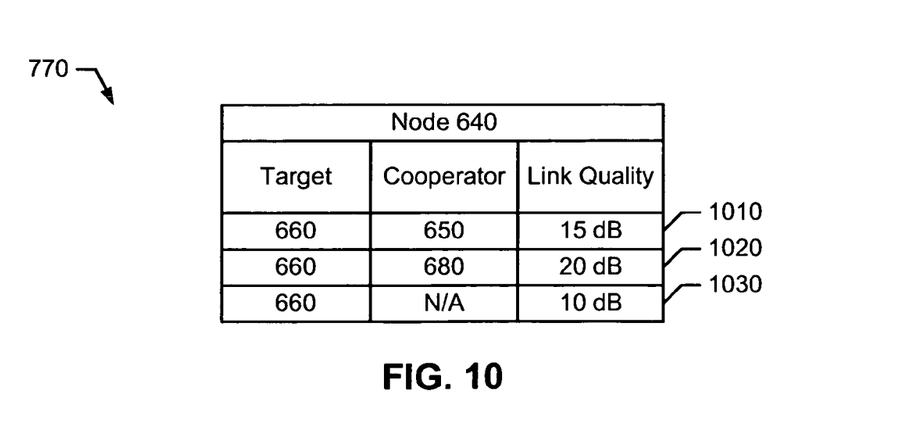
FIG. 10 is a block diagram representation of an example cooperation table of the example communication node of FIG. 6.

Turning to FIG. 10, for example, the cooperation table 770 may include one or more entries to provide cooperation information such as neighbor node information, cooperator node information, metric information, and/or other suitable cooperation information. Although FIG. 10 depicts three entries, the routing table 770 may include additional or fewer entries.

In one example, the entry 1010 may provide link quality information associated with the link 696 between the candidate node 650 and the target node 660 if the communication node 640 and the candidate node 650 operate cooperatively to communicate with the target node 660. In another example, the entry 1020 may provide link quality information associated with the link 697 between the candidate node 680 and the target node 660 if the communication node 640 and the candidate node 680 operate cooperatively to communicate with the target node 660. The cooperation table 770 may also provide link quality information associated with a link without the assistance of a cooperator node. For example, the entry 1030 may provide link quality information associated with the link 698 between the communication node 640 and the target node 660 (e.g., the communication node 640 directly communicating with the target node 660).

The communication node 640 may select the candidate node 680 to operate as a cooperator node because the cooperation table 770 may indicate that cooperation with the candidate node 680 provides better link quality (e.g., a total of 30 dB with 20 dB from the link 697 and 10 dB from the link 698) than either cooperation with the candidate node 650 or without cooperation (e.g., 25 dB and 10 dB, respectively). The communication node 640 may operate cooperatively with the cooperator node 680 to communicate with the target node 660. In one example, the communication node 640 may forward a packet to the cooperator node 680 over link 695. Accordingly, the cooperator node 680 and the communication node 640 may transmit the packet simultaneously to the target node 660 via the links 697 and 698, respectively. The packet may reach the target node 660 with a combined signal strength of thirty dB (e.g., 20 dB from the link 697 and 10 dB from the link 698). Thus, the packet may propagate from the source node 610 to the destination node 670 via a multi-hop route including links 691, 692, 693, and 699 as well as a link formed through cooperative diversity by combining links 697 and 698. Thus, the multi-hop route described above may represent a hybrid route resulting from a combination of multi-hop routing and cooperative diversity.

At each hop, the path selector 735 (e.g., via the multi-hop routing layer 830) may choose a sub-path (e.g., either the multi-hop routing sub-path or the cooperative diversity sub-path) to route the packet from the communication node 700 toward the destination node 670. As noted above, the multi-hop routing layer 830 identified the multi-hop routing sub-path, which includes cooperation between the links 694 and 696. The cooperative diversity layer 860 identified the cooperative diversity sub-path, which includes cooperation between the communication node 640 and candidate node(s) 650 and/or 680.

Figure 11:
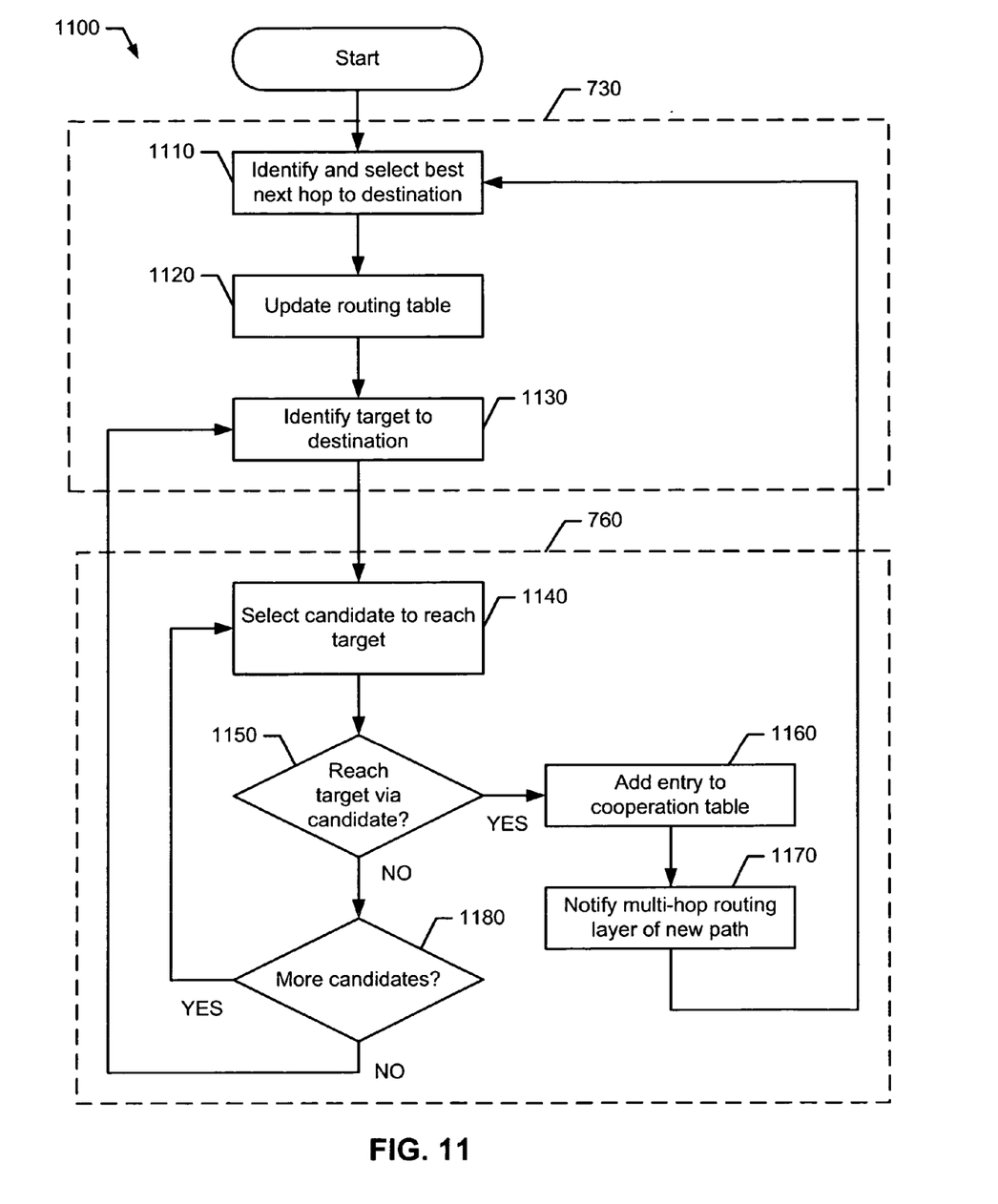
FIG. 11 is a flow diagram representation of one manner in which the example communication node of FIG. 6 may be configured to provide an integrated multi-hop routing and cooperative diversity system.

FIG. 11 depicts one manner in which the example communication node 700 of FIG. 7 may be configured to operate in a cooperative routing system. The example process 1100 of FIG. 11 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 11, these actions may be performed in other temporal sequences. Again, the example process 1100 is merely provided and described in conjunction with the communication node 700 of FIG. 7 as an example of one way to configure a communication node to operate to provide the integrated multi-hop routing and cooperative diversity system 800 of FIG. 8.

In the example of FIG. 11, the process 1100 may begin with the communication node 700 (e.g., via the node identifier 720 of FIG. 7 and the multi-hop routing layer 830 of FIG. 8) identifying and selecting the best next hop toward the destination (block 1110). For example, the communication node 700 may identify and select a neighbor node associated with a link quality relative better than other neighbor nodes of the communication node 700. Accordingly, the communication node 700 (e.g., via the multi-hop routing layer 830 of FIG. 8) may update the routing table 760 (block 1120). The communication node 700 (e.g., via the multi-hop routing layer 830 of FIG. 8) may identify a target node toward the destination, which may be a two-hop neighbor on a selected multi-hop routing sub-path (block 1130).

The communication node 700 (e.g., via the cooperative diversity layer 860 of FIG. 8) may select a candidate node to operate as a cooperator node to communicate with the target node (block 1140). The communication node 700 (e.g., via cooperative diversity layer 860 of FIG. 8) may determine whether the candidate node may communicate with the target node (block 1150). If the communication node 700 may reach the target node via the candidate node, the communication node 700 (e.g., via the node selector 730 of FIG. 7) may add an entry associated with the candidate node to the cooperation table 770 (block 1160). In particular, the entry may indicate that the candidate node may operate as a cooperator node. The entry may also provide metric information associated with the link between the cooperator node and the destination node. Accordingly, the communication node 700 (e.g., via the cooperation layer 860 of FIG. 8) may notify the multi-hop routing layer 830 of a new cooperative diversity sub-path to the target node (block 1170). Control may return to the multi-hop routing layer 830 to block 1110. The multi-hop routing layer 830 may determine whether to use the multi-hop routing sub-path or the cooperative diversity sub-path as the next hop toward the destination node. In one example, the multi-hop routing layer 830 may choose to use the path with better metrics (e.g., a link condition/characteristic such as bit error rate, total power consumption, etc.).

Turning back to block 1150, if the communication node 700 cannot reach the target node via the candidate node, the communication node 700 may determine whether additional candidate nodes are available (block 1180). For example, if the communication node 700 is unable to transmit a packet to the target node with cooperation from a candidate node, the communication node 700 may attempt to reach the target node via other candidate nodes. If additional candidate nodes are available, control may return to block 1140. Otherwise if no additional candidate node is available, control may return to the multi-hop routing layer 830 at block 1130.

While the methods and apparatus disclosed herein are described in FIG. 11 to operate in a particular manner, the methods and apparatus disclosed herein are readily applicable without certain blocks depicted in FIG. 11. In addition, while FIG. 11 depicts particular blocks, the actions performed by some of these blocks may be integrated within a single block or may be implemented using two or more separate blocks.

Further, although the methods and apparatus disclosed herein are described with respect to wireless mesh networks the methods and apparatus disclosed herein are readily applicable to many other types of wireless communication networks. For example, the methods and apparatus disclosed herein may be applied to WPANS, WLANs, WMANs, WWANs, and/or broadband wireless access (BWA) networks. In one example, the methods and apparatus disclosed herein may be applicable to access points and/or base stations. The methods and apparatus described herein are not limited in this regard.

Figure 12:
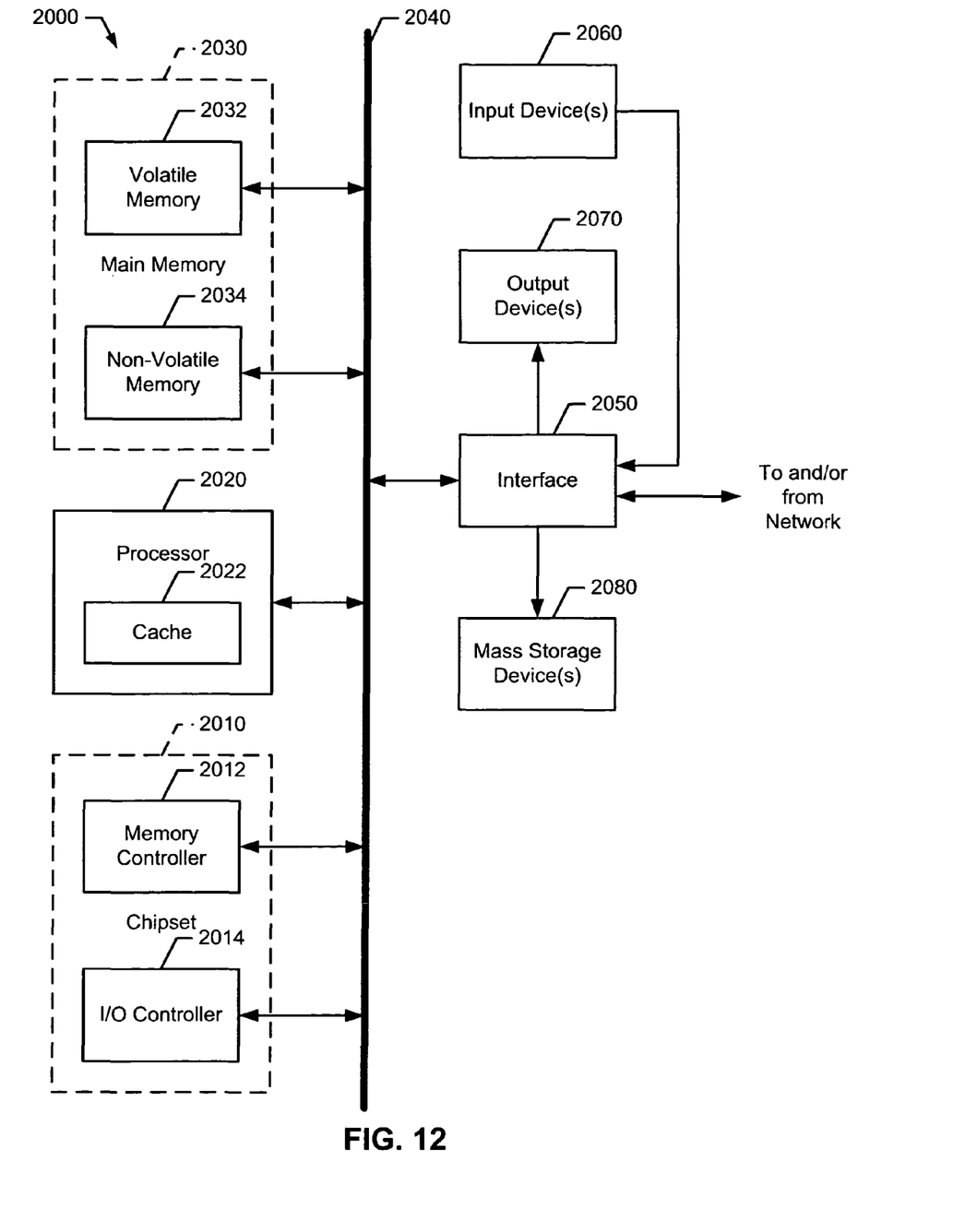
FIG. 12 is a block diagram representation of an example processor system that may be used to implement the example communication node of FIG. 6.

FIG. 12 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 12 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad/ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 12 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
    identifying a target node at a communication node of a wireless communication network, the target node being associated with a multi-hop route from the communication node to a destination node;
    selecting a neighbor node of the communication node to operate as a cooperator node, the cooperator node and the communication node operating cooperatively to communicate with the target node;
    identifying a first route from the communication node to the target node, wherein the first route does not include any intermediate node between the communication node and the target node;
    identifying a second route from the communication node to the target node via the cooperator node, the second route including a first link between the communication node and the cooperator node and a second link between the cooperator node and the target node, wherein the second link does not include any intermediate node between the cooperator node and the target node;
    transmitting a data packet from the communication node to the cooperator node over the first link of the second route and from the communication node directly to the target node over the first route; and
    controlling a timing of the transmitting of the data packet from the communication node directly to the target node over the first route such that the transmitting of the data packet from the communication node directly to the target node over the first route occurs substantially simultaneously with a transmitting of the data packet from the cooperator node directly to the target node over the second link of the second route.

2. A method as defined in claim 1, wherein identifying the target node at the communication node comprises identifying the target node via a multi-hop routing layer of a protocol stack associated with the communication node.

3. A method as defined in claim 1, wherein identifying the target node at the communication node comprises identifying a two-hop neighbor node at a mesh node associated with a wireless mesh network.

4. A method as defined in claim 1, wherein identifying the target node at the communication node comprises iteratively identifying the target node at the communication node.

5. A method as defined in claim 1, wherein selecting the neighbor node of the communication node comprises identifying one or more candidate nodes based on a condition of a link associated with the one or more candidate nodes and the target node.

6. A method as defined in claim 1, wherein selecting the neighbor nodes of the communication node further comprises:
    selecting the neighbor node via a cooperative diversity layer of a protocol stack associated with the communication node, and wherein the cooperative diversity layer is integrated with at least one of media access control layer or a physical layer.

7. A method as defined in claim 1 further comprising selecting one of a multi-hop routing sub-path or a cooperative diversity sub-path to route a packet from the communication node toward the destination node, wherein the multi-hop routing sub-path is identified by a multi-hop routing layer of a protocol stack associated with the communication node, and wherein the cooperative diversity sub-path is identified by a cooperative diversity layer independent of the multi-hop routing layer.

8. The method of claim 1, wherein said controlling further comprises:
    controlling the timing such that the transmitting of the data packet from the communication node directly to the target node over the first route occurs simultaneously with the transmitting of the data packet from the cooperator node directly to the target node over the second link of the second route.

9. A method of claim 1, wherein the cooperator node is a first cooperator node, the method further comprising:
    selecting another neighbor node of the communication node to operate as a second cooperator node, wherein the first and second cooperator nodes and the communication node operates cooperatively to communicate with the target node;
    identifying a third route from the communication node to the target node via the second cooperator node, the third route including a third link between the communication node and the second cooperator node and a fourth link between the second cooperator node and the target node, wherein the fourth link does not include any intermediate node between the second cooperator node and the target node;
    transmitting the data packet from the communication node to the second cooperator node over the third link of the third route; and
    controlling the timing of the transmitting of the data packet from the communication node directly to the target node over the first route such that the transmitting of the data packet from the communication node directly to the target node over the first route occurs substantially simultaneously with a transmitting of the data packet from the second cooperator node directly to the target node over the fourth link of the third route.

10. The method of claim 1, wherein said controlling of the timing of the transmitting of the data packet is configured to provide a cooperatively diverse transmission of the data packet to the target node.

11. An apparatus comprising:
a node identifier to identify a target node at a communication node of a wireless communication network, the target node being associated with a path from the communication node toward a destination node of a multi-hop route;
a node selector operatively coupled to the node identifier to select one or more neighbor nodes as a cooperator node, the cooperator node and the communication node operating cooperatively to communicate with the target node,
a path selector to identify a first route from the communication node to the target node, wherein the first route does not include any intermediate node between the communication node and the target node;
wherein path selected is further configured to identify a second route from the communication node to the target node via the cooperator node, the second route including a first link between the communication node and the cooperator node and a second link between the cooperator node and the target node, wherein the second link does not include any intermediate node between the cooperator node and the target node; and
wherein the apparatus further comprises a transmitter configured to transmit a data packet from the communication node to the cooperator node over the first link of the second route;
to transmit the data packet from the communication node directly to the target node over the first route; and
wherein the transmitter is further configured to control a timing of the transmission of the data packet from the communication node directly to the target node over the first route such that the transmission of the data packet from the communication node directly to the target node over the first route occurs substantially simultaneously with a transmission of the data packet from the cooperator node directly to the target node over the second link of the second route.

12. An apparatus as defined in claim 11, wherein the node identifier comprises a multi-hop routing layer of a protocol stack associated with the communication node.

13. An apparatus as defined in claim 11, wherein the node selector comprises a cooperative diversity layer of a protocol stack associated with the communication node, and wherein the cooperative diversity layer is integrated with at least one of media access control layer or a physical layer.

14. An apparatus as defined in claim 11, wherein the node identifier is configured to identify a two-hop neighbor node at a mesh node associated with a wireless mesh network.

15. An apparatus as defined in claim 11, wherein the node identifier is configured to identify iteratively the target node at the communication node.

16. An apparatus as defined in claim 11 wherein the path selector is further configured to select one of a multi-hop routing sub-path or a cooperative diversity sub-path to route a packet from the communication node toward the destination node, wherein the multi-hop routing sub-path is identified by a multi-hop routing layer of a protocol stack associated with the communication node, and wherein the cooperative diversity sub-path is identified by a cooperative diversity layer independent of the multi-hop routing layer.

* * * * *